United States Patent [19]

Sandström

[11] 4,352,527
[45] Oct. 5, 1982

[54] WATER-LUBRICATED BEARING CONSTRUCTION FOR SHIP'S PROPELLER SHAFT

[75] Inventor: Anders Sandström, Nynäshamn, Sweden

[73] Assignee: Scatra AB, Nynäshamn, Sweden

[21] Appl. No.: 169,167

[22] Filed: Jul. 15, 1980

[51] Int. Cl.³ .................. F16C 17/14; F16C 27/02; F16C 27/06

[52] U.S. Cl. .................. 308/26; 308/238; 308/DIG. 12

[58] Field of Search .......... 308/26, 28, 121, 238, 308/240, DIG. 12

[56] References Cited

U.S. PATENT DOCUMENTS

| | | | |
|---|---|---|---|
| 1,555,214 | 9/1925 | Johnson | 308/238 |
| 1,895,936 | 1/1933 | Merrill | 308/238 |
| 1,919,375 | 7/1933 | Maclachlan et al. | 308/238 |
| 2,348,275 | 5/1944 | Aker | 308/238 |
| 2,839,340 | 6/1958 | Merchant | 308/238 |
| 3,023,059 | 2/1962 | Kirk | 308/238 |
| 3,302,988 | 2/1967 | Senter | 308/238 |
| 3,455,613 | 7/1969 | McGrath | 308/26 |
| 3,932,004 | 1/1976 | Orndorff, Jr. | 308/238 |
| 3,971,606 | 7/1976 | Nakano et al. | 308/238 |

FOREIGN PATENT DOCUMENTS 52-31844  8/1977  Japan .......................... 308/240

*Primary Examiner*—Richard R. Stearns
*Attorney, Agent, or Firm*—Toren, McGeady & Stanger

[57] ABSTRACT

A propeller system for ships includes a propeller shaft connected to be driven by a ship's drive shaft in order to drive the propeller of the ship connected thereto. The propeller shaft extends through a water-lubricated bearing located in the stern frame of the ship and the bearing is formed to include a first layer of hard rubber extending coaxially about the propeller shaft, a second layer of soft rubber arranged coaxially with the first layer and a tubular member exteriorly enclosing the water-lubricated bearing. Blind-ended bores are circumferentially distributed in the second layer and extend through approximately two-thirds of the length of the bearing.

8 Claims, 5 Drawing Figures

WATER-LUBRICATED BEARING CONSTRUCTION FOR SHIP'S PROPELLER SHAFT

The present invention relates generally to marine craft and more particularly to propelling systems for ships. More specifically, the invention is directed toward propelling units and drive shafts connected to a propeller shaft serving for torque transmission to a ship's propeller wherein the propeller shaft is guided through a water-lubricated bearing including rubber as part of its construction and located in the stern frame of the ship's body extending to the rearward end of the drive shaft.

In propelling systems of this type, it has been suggested to elastically support the entire propelling unit including the drive shaft and the propeller shaft in order to reduce vibrations and sound transmission, as indicated in German Offenlegungsschrift No. 2 303 723. However, in a propelling system of this type, although the entire propelling unit with the corresponding drive shaft can be elastically supported, vibrations generated in the entire drive system must be damped so that the vibrations will not be transmitted to the ship's body and result in vibration and noise. Because of specific requirements with regard to the arrangement involved, a substantial amount of space is necessary and a design engineer will be limited in the choice of arrangement which may be provided in the ship's body. If it is desired in addition to avoid vibrations, shaking and rumbling the utility space of the vessel will also be reduced. In view of the foregoing, the present invention is directed toward provision of a propelling system for a ship which will insure quiet operation, and substantially eliminate transmission of vibrations of the drive shaft and the propeller shaft wherein the individual arrangement of the units comprising the propelling system will be maintained.

SUMMARY OF THE INVENTION

Briefly, the present invention is directed toward a propeller system for ships which includes a propeller shaft connected to be driven by a ship's drive shaft to drive a ship's propeller connected thereto with water-lubricated bearing means being located in the stern frame of the ship having said propeller shaft extending therethrough. In accordance with the invention, the water-lubricated bearing means is structured to comprise a first layer of hard rubber extending coaxially about the propeller shaft, a second layer of soft rubber arranged coaxially with said first layer and with a tubular member externally enclosing the water-lubricated bearing means.

The tubular member is formed with an inner and an outer casing consisting of a material having a high specific weight and with a median layer having a low specific weight.

In this embodiment of the invention, an advantage arises in that the propeller shaft continues to be supported in a water-lubricated rubber bearing of the stern frame wherein the layer of hard rubber which is necessary for support is no longer in contact with the ship's body so that the vibrations and noises which occur are absorbed by the additional layers.

In accordance with a further important feature of the invention the tubular member is arranged to consist of two metal tubes with an intermediate layer of soft rubber therebetween.

Due to the use of two metal tubes having a high specific weight, it is possible to easily prevent vibrations and noise from being transmitted from the inner tubular member to the outer tubular member because the intermediate layer of soft rubber reduces strains to a significant extent.

Additionally, the present invention is structured so that the second layer of soft rubber of the bearing will have at least twice the cross-sectional area as that of the first layer of hard rubber.

Due to the appropriate dimensioning of the layer of hard rubber which is arranged directly on the propeller shaft and the layer of soft rubber with an appropriate thickness, vibrations are prevented from being transmitted because the actual function of the bearing will be assumed by the layer of hard rubber and the bearing will be fixed with loads being reduced by means of the soft rubber layer.

In accordance with a further feature of the invention it is provided that the second layer is formed with axially extending blind-ended bores which are distributed over the circumference thereof and which extend through approximately two-thirds the length of the bearing.

Due to these bores which extend axially in the soft rubber layer, this layer becomes even more elastic so that further improvement is achieved in that a pumping effect acts upon the lubricant. That is, because of deformation of the bores a forced circulation of the water medium occurs.

In a further embodiment of the invention, the bores are provided to extend alternately from different end faces of the bearing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
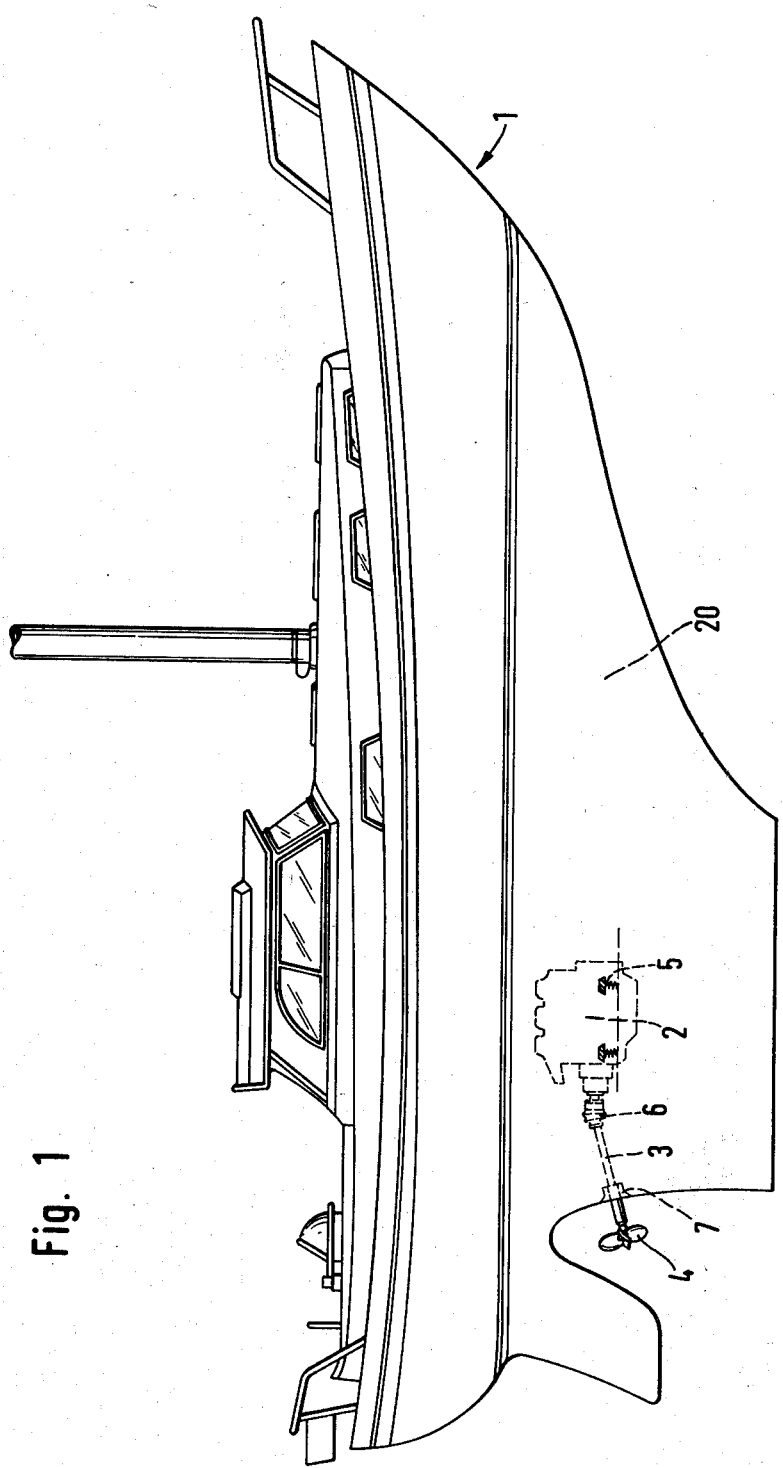
FIG. 1 is a schematic illustration of a ship showing the arrangement of a propelling unit with a propelling shaft.

Referring now to the drawings wherein similar reference numerals are used to refer to like parts throughout the various figures thereof, there is shown in FIG. 1 a ship's body 1 having a propelling system which consists of a propelling engine unit 2 and a propeller 4 which is connected with a propeller shaft 3. The engine 2 is elastically supported in the ship's body 1 through bearing means 5. The engine is capable of performing movement relative to the ship's body 1 and these movements are compensated by a universal joint shaft 6.

The propeller shaft 3 is guided in a water-lubricated bearing means 7 through the stern frame of the ship's body. This bearing means consists essentially of rubber and prevents transmission of noise and vibrations from the propeller unit to the ship's body 1. Slight relative movements of the propeller shaft 3 are also compensated by the bearing means 7.

Figure 2:
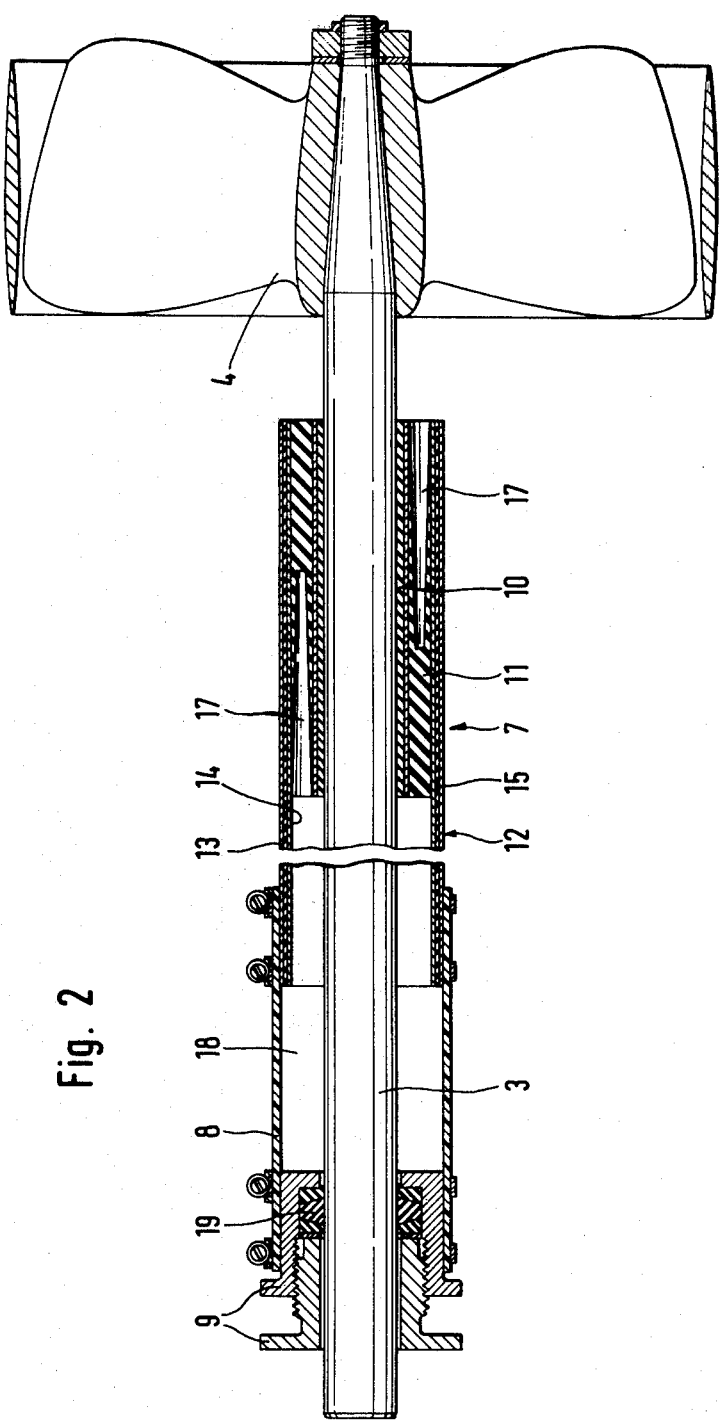
FIG. 2 is a cross-sectional view illustrating in greater detail on a larger scale a propeller assembly having a bearing in accordance with the present invention operatively associated therewith.

The bearing means 7 shown in FIG. 1 are shown in greater detail in FIG. 2 wherein there is illustrated a propeller shaft which, at one end thereof, has the propeller 4 connected thereto and which is connected at its other end to a shaft seal 9 through a tube 8. The water-lubricated bearing means 7 consists of a layer 10 which in this case is formed of hard rubber. The bearing means 7 also consists of another layer 11 which is made of soft rubber. The two layers 10 and 11 are arranged in a tubular member 12 whose outer and inner casing surfaces 13 and 14 are made of metal, the two casings being connected to each other through a layer of soft rubber 15 which is vulcanized therebetween.

Vibrations of the propeller shaft 3 are transmitted from the layer of hard rubber 10 to the layer of soft rubber 11 and they are essentially absorbed by the latter. The bearing means 7 is fixed in the ship's body 1 by means of the tubular member 12 through the outer casing surface 13 of the member 12.

As indicated in FIG. 2, the soft rubber layer 11 is formed with blind ended bores 17 which extend partially through the length thereof beginning from one end face of the layer 11. As indicated in FIG. 2, bores 17 may be formed to extend from either of the two opposite end faces of the layer 11.

Figure 3A:
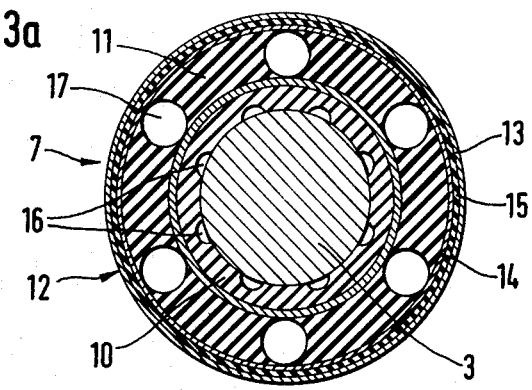
FIGS. 3a, 3b and 3c are each cross-sectional views showing different embodiments of the invention.
Figure 3B:
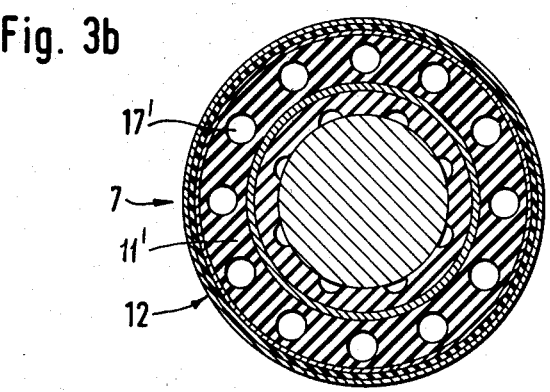
Figure 3C:
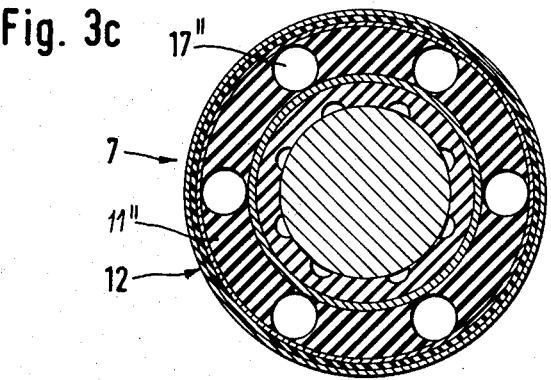

The circumferential arrangement and diameter dimensions of bores 17, 17' and 17" are shown in FIGS. 3a, 3b and 3c which indicate the arrangement of the axially extending blind-end bores which serve to impart additional flexibility to the soft rubber layer 11. Upon deformation of the soft rubber layer, a pumping action is performed as a result of the bores 17 which serves to provide for forced circulation of water.

In each of the embodiments shown in FIGS. 3a–3c, a soft rubber layer 11, 11' or 11" is received in the tubular member 12 which, as shown in the sectional view of FIG. 2, consists of 3 layers wherein the layers 13 and 14 are arranged to have a high specific weight with the layer 15 being arranged to have a low specific weight.

It will be further seen that, as best illustrated in FIGS. 3a, 3b and 3c the inner layer 10 is formed with grooves 16.

During operation of the propeller shaft of the type disclosed herein, water will flow into the entire hollow space 18 shown in FIG. 2. By means of the shaft seal 9 and its contact seal 19, water is prevented from entering the inner space 20 of the ship's body 1.

While specific embodiments of the invention have been shown and described in detail to illustrate the application of the inventive principles, it will be understood that the invention may be embodied otherwise without departing from such principles.

What is claimed is:

1. In a propeller system for ships including a propeller shaft connected to be driven by a ship's drive shaft to drive a ship's propeller connected thereto, with water-lubricated bearing means located in the stern frame of said ship having said propeller shaft extending therethrough, the improvement wherein said water-lubricated bearing means comprise a first layer of hard rubber extending coaxially about said propeller shaft, a second layer of soft rubber arranged coaxially with said first layer and a tubular member externally enclosing said water-lubricated bearing means, said tubular member being formed with an inner casing, an outer casing and with an intermediate layer located therebetween, said inner casing and said outer casing each consisting of a material having a high specific weight with said intermediate layer being formed of a material having a low specific weight.

2. A system according to claim 1 wherein said first layer of hard rubber is located radially within said second layer of soft rubber.

3. A system according to claim 1 wherein said tubular member is formed with a pair of metallic tubes having an intermediate layer of soft rubber located therebetween.

4. A system according to claim 1 wherein said second layer of soft rubber of said bearing is formed with a cross-sectional area which is at least twice as large as the cross-sectional area of said first layer of hard rubber.

5. A system according to claim 1 wherein said second layer of soft rubber has formed therein axially extending blind-ended bores distributed over the circumference thereof and extending over approximately two-thirds of the length of said bearing means.

6. In a propeller system for ships including a propeller shaft connected to be driven by a ship's drive shaft to drive a ship's propeller connected thereto, with water-lubricated bearing means located in the stern frame of said ship having said propeller shaft extending therethrough, the improvement wherein said water-lubricated bearing means comprise a first layer of hard rubber extending coaxially about said propeller shaft, a second layer of soft rubber arranged coaxially with said first layer and a tubular member externally enclosing said water-lubricated bearing means, said tubular member being formed with a pair of metallic tubes having an intermediate layer of soft rubber located therebetween.

7. In a propeller system for ships including a propeller shaft connected to be driven by a ship's drive shaft to drive a ship's propeller connected thereto, with water-lubricated bearing means located in the stern frame of said ship having said propeller shaft extending therethrough, the improvement wherein said water-lubricated bearing means comprise a first layer of hard rubber extending coaxially about said propeller shaft, a second layer of soft rubber arranged coaxially with said first layer and a tubular member externally enclosing said water-lubricated bearing means, said second layer of soft rubber having formed therein axially extending blind-ended bores distributed over the circumference thereof and extending over approximately two-thirds of the length of said bearing means.

8. A system according to claim 5 or 7 wherein said bores are circumferentially distributed around said second layer, with said bores alternately extending through different end faces of said second layer.

* * * * *